United States Patent [19]

Funabashi et al.

[11] Patent Number: 4,981,930

[45] Date of Patent: Jan. 1, 1991

[54] METHOD OF PRODUCTION OF POLYOLEFINS

[75] Inventors: Hideo Funabashi; Akira Tanaka; Rikuo Ohnishi, all of Ichihara, Japan

[73] Assignee: Idemitsu Petrochemical Company Limited, Tokyo, Japan

[21] Appl. No.: 171,719

[22] Filed: Mar. 22, 1988

[30] Foreign Application Priority Data

Mar. 23, 1987 [JP] Japan .................................. 62-68378
Mar. 23, 1987 [JP] Japan .................................. 62-68379

[51] Int. Cl.$^5$ .......................... C08F 4/654; C08F 10/00
[52] U.S. Cl. ...................................... 526/142; 502/126; 526/124; 526/128; 526/141; 526/351; 526/348.6; 526/901
[58] Field of Search ............... 526/125, 128, 141, 142, 526/124

[56] References Cited

U.S. PATENT DOCUMENTS

| | | | |
|---|---|---|---|
| 4,613,579 | 9/1986 | Furuhashi et al. | 502/115 |
| 4,701,505 | 10/1987 | Fujii et al. | 526/142 |
| 4,716,206 | 12/1987 | Fujita et al. | 526/142 |
| 4,724,255 | 2/1988 | Lofgren et al. | 526/137 |

FOREIGN PATENT DOCUMENTS

0198151 10/1986 European Pat. Off.
1147121 4/1969 United Kingdom ............... 526/142

*Primary Examiner*—Edward J. Smith

*Attorney, Agent, or Firm*—Armstrong, Nikaido, Marmelstein, Kubovcik & Murray

[57] ABSTRACT

A method of producing a polyolefin. An olefin is polymerized in the presence of a catalyst containing (A) a catalyst component containing magnesium, titanium, halogen and an electron donor, (B) an organoaluminum compound and (C) an external electron donor which is an ether compound ($C^1$) of the formula [1a]:

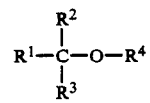

or formula [1b]:

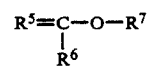

wherein $R^1$, $R^2$, $R^4$ and $R^7$ are saturated or unsaturated aliphatic hydrocarbyl group having 1 to 7 carbon atoms; $R^3$ and $R^6$ are a hydrogen atom or a saturated or unsaturated aliphatic hydrocarbyl group having 1 to 7 carbons and $R^5$ is a divalent aliphatic hydrocarbyl group having 1 to 7 carbon atoms. The catalyst used in the polymerization may also contain a carboxylate, organosilicon compound and/or an azo compound.

6 Claims, No Drawings

METHOD OF PRODUCTION OF POLYOLEFINS

BACKGROUND OF THE INVENTION

This invention relates to a method of producing a polyolefin such as polypropylene and polybutene-1, more particularly to a method of producing a polyolefin having a good steric regularity and high molecular weight, with good yield.

DESCRIPTION OF RELATED ART

There have hitherto been proposed many methods of producing a polyolefin using a highly active catalyst comprising a combination of a solid catalyst component containing magnesium, titanium, a halogen and an electron donor as essential ingredients with an external electron donor such as an organoaluminum compound, ester and organosilicon compound (see, for example, Japanese patent Kokai =Laid-Open=Nos. 56-39767, 55-104303, 56-115301, 57-63312 and 59-6205).

However, most of these methods are not only unsatisfactory to completely eliminate a step of washing to remove atactic polymers or a step of removing ash, but also catalysts used in these methods have unsatisfactory catalytic activity. Furthermore, the steric regularity and molecular weight of the polymers have been required to be more improved.

On the other hand, methods using phosphites as an internal or external electron donor in catalysts are known (see, for example, Japanese patent Kokai =Laid-Open=Nos. 55-104303 and 58-138711). These methods have such defects that the catalytic activity, steric regularity and etc. are also unsatisfactory.

Furthermore, methods using an aromatic hydrocarbyl group-containing ether as the external electron donor are known (see, for example, Japanese patent Kokai =Laid-Open=Nos. 61-78804 and 61-145206). However, these methods have such defects that the durability of catalytic activity is unsatisfactory and the catalysts used are too costly to be advantageous in industries.

SUMMARY OF THE INVENTION

The object of this invention is to eliminate the defects of prior art as mentioned above, that is, to provide a method of producing a polyolefin having a good steric regularity, with high yield and by stable and efficient procedures in which a catalyst having a high catalytic activity and excellent durability of activity is used.

In accordance with one aspect of this invention, there is provided a method of producing a polyolefin in the presence of a catalyst comprising (A) a highly active catalyst component containing magnesium, titanium, a halogen and an electron donor as essential ingredients, (B) an organoaluminum compound and (C) an external electron donor, which comprises carrying out homopolymerization or copolymerization of olefins by using as the external electron donor (C) an ether compound ($C^1$) represented by the formula [1a]:

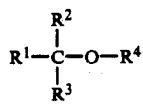

[1a]

wherein $R^1$, $R^2$ and $R^4$ are a saturated or unsaturated aliphatic hydrocarbyl group having 1 to 7 carbons and $R^3$ hydrogen atom or a saturated or unsaturated aliphatic hydrocarbyl group having 1 to 7 carbons, or by the formula [1b]:

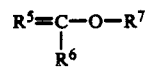

[1b]

wherein $R^5$ is a divalent aliphatic hydrocarbyl group having 1 to 7 carbons, $R^6$ the same group as $R^3$ in the formula [1a] and $R^7$ the same group as $R^4$ in the formula [1a].

In accordance with another aspect of this invention, there is provided a method of producing a polyolefin in the presence of a catalyst comprising (A) a highly active catalyst component containing magnesium, titanium, a halogen and an electron donor as essential ingredients, (B) an organoaluminum compound and (C) an external electron donor, which comprises carrying out homopolymerization or copolymerization of olefins by using as the external electron donor (C) an ether compound ($C^1$) represented by the formula [1a]:

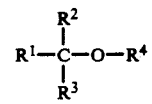

[1a]

wherein $R^1$, $R'$ and $R^4$ are a saturated or unsaturated aliphatic hydrocarbyl group having 1 to 7 carbons and $R^3$ hydrogen atom or a saturated or unsaturated aliphatic hydrocarbyl group having 1 to 7 carbons, or by the formula [1b]:

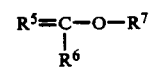

[1b]

wherein $R^5$ is a divalent aliphatic hydrocarbyl group having 1 to 7 carbons, $R^6$ the same group as $R^3$ in the formula [1a] and $R^7$ the same group as $R^4$ in the formula [1b]; and at least one compound ($C^2$) selected from the group consisting of carboxylic esters; organosilicon compounds; and azo compounds.

DETAILED DESCRIPTION OF THE PREFERRED EMBODIMENTS

The catalysts used in this invention are highly active polymerization ones obtained from (A) a solid catalyst component containing as essential ingredients magnesium, titanium, a halogen and an electron donor, (B) an organoaluminum compound, and (C) an external electron donor which is a specified ether compound ($C^4$), or from (A) a solid catalyst component containing as essential ingredients magnesium, titanium, a halogen and an electron donor, (B) an organoaluminum compound, and (C) an external electron donor which is a specified ether compound ($C^1$) and a specified compound ($C^2$).

These catalysts may be prepared in the following manner. Preparation of Solid Catalyst Component (A)

The solid catalyst component (A) may be prepared by contact of (A-1) a magnesium compound, (A-2) a titanium halide and (A-3) an electron donor. The magnesium compound (A-1) includes reaction products of organomagnesium compounds such as a magnesium dihalide, magnesium hydroxide, hydrotalcite, magnesium carboxylate, alkoxymagnesium, aryloxymagnesium, alkoxymagnesium halide, aryloxymagnesium halide, alkylmagnesium and alkylmagnesium halide with an electron donor, a halosilane, alkoxysilane, silanol and aluminum compound.

Among these magnesium compounds are preferred the magnesium halide, alkoxymagnesium, alkylmagnesium and alkylmagnesium halide, particularly the alkoxymagnesium and alkylmagnesium.

As the titanium compound (A-2) which is one of the raw materials for the solid catalyst component (A), there may be used, for example, a titanium tetrahalide such as $TiCl_4$, $TiBr_4$ and $TiI_4$; an alkoxytitanium trihalide such as $Ti(OCH_4)Cl_3$, $Ti(OC_2H_5)Cl_3$, $(n-C_4H_9O)TiCl_3$ and $Ti(OC_2H_5)Br_3$; an alkoxytitanium dihalide such as $Ti(OCH_3)_2Cl_2$, $Ti(OC_2H_5)_2Cl_2$, $(n-C_4H_9O)_2TiCl_2$ and $Ti(OC_3H_7)_2Cl_2$; a trialkoxytitanium monohalide such as $Ti(OCH_3)_3Cl$, $Ti(OC_2H_5)_3Cl$, $(n-C_4H_9O)_3Cl$ and $Ti(OCH_3)_3Br$; and a tetraalkoxytitanium such as $Ti(OCH_3)_4$, $Ti(OC_2H_5)_4$ and $Ti(n-C_4H_9O)_4$.

These titanium compounds may be used singly or in combination.

Among these titanium compounds is preferred a high halogen content compound, particularly titanium tetrachloride.

As the electron donor (A-3) which is one of the raw materials for the solid catalyst component, there may be used an oxygen-, nitrogen-, phosphorus- or sulfur-containing organic compound.

The electron donor (A-3) includes, for example, esters, thioesters, amines, amides, ketones, nitriles, phosphines, ethers, thioethers, acid anhydrides, acid halides, acid amides, aldehydes or organic acids.

The actual examples are aromatic dicarboxylic diesters such as dimethyl phthalate, diethyl phthalate, dipropyl phthalate, di-n-butyl phthalate, diisobutyl phthalate, methyl ethyl phthalate, methyl propyl phthalate, methyl isobutyl phthalate, ethyl propyl phthalate, ethyl isobutyl phthalate, propyl isobutyl phthalate, dimethyl terephthalate, diethyl terephthalate, dipropyl terephthalate, diisobutyl terephthalate, methyl ethyl terephthalate, methyl propyl terephthalate, methyl isobutyl terephthalate, ethyl propyl terephthalate, ethyl isobutyl terephthalate, propyl isobutyl terephthalate, dimethyl isophthalate, diethyl isophthalate, dipropyl isophthalate, diisobutyl isophthalate, methyl ethyl isophthalate, methyl propyl isophthalate, methyl isobutyl isophthalate, ethyl propyl isophthalate, ethyl isobutyl isophthalate and propyl isobutyl isophthalate; monoesters such as methyl formate, methyl acetate, ethyl acetate, vinyl acetate, propyl acetate, octyl acetate, cyclohexyl acetate, ethyl propionate, ethyl valerate, methyl chloracetate, ethyl dichloroacetate, methyl methacrylate, ethyl crotonate, ethyl pivalate, dimethyl maleate, ethyl cyclohexyl, carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl anisate, ethyl ethoxybenzoate, ethyl p-butoxybenzoate, ethyl o-chlorobenzoate and ethyl naphthoate; esters having 2 to 18 carbons such as γ-butyrolactone, δ-valerolactone, coumarin, phthalide and ethylene carbonate; organic acids such as an aromatic carboxylate such as benzoic acid and p-oxybenzoic acid; acid anhydrides such as succinic anhydride, benzoic anhydride and p-toluic anhydride; ketones having 3 to 15 carbons such as acetone, methyl ethyl ketone, methyl isobutyl ketone, acetophenone, benzophenone and benzoquinone; aldehydes having 2 to 15 carbons such as acetaldehyde, propionaldehyde, octylaldehyde, benzaldehyde, tolualdehyde, naphthylaldehyde; acid halides having 2 to 15 carbons such as acetyl chloride, benzyl chloride, toluyl chloride and anisyl chloride; ethers having 2 to 20 carbon atoms such as methyl ether, ethyl ether, isopropyl ether, n-butyl ether, amyl ether, tetrahydrofuran, anisol, diphenyl ether and ethylene glycol butyl ether; acid amides such as acetic amide, benzoic amide and toluyl amide; amines such as tributyl amine, N,N'-dimethyl piperazine, tribenzyl amine, aniline, pyridine, picoline and tetramethyl-ethylene diamine; and nitriles such as acetonitrile, benzonitrile and trinitrile.

Among these substances are preferred the esters, ethers, ketones and acid anhydrides. Particularly, an aromatic dicarboxylic diester such as di-n-butyl phthalate, or a $C_1-C_4$ alkyl ester of an aromatic carboxylic acid such as benzoic acid, p-methoxybenzoic acid, p-ethoxybenzoic acid and toluic acid are preferred. The aromatic dicarboxylic diester is most preferred since it does not only improve the catalytic activity and durability of activity but also the steric regularity of the resultant polymer.

PREPARATION OF SOLID CATALYST COMPONENT

The solid catalyst component may be prepared in accordance with the methods described in Japanese Patent Kokai=Laid-Open=Nos. 53-43094, 55-135192, 55-135103, 56-811, 56-11908 and 56-18606.

Some examples of the methods of producing the solid catalyst component (A) are:

(1) a magnesium compound (A-1) or a complex of the magnesium compound and an electron donor (A-3) is pulverized in the presence of or in the absence of a pulverizing agent, or not pulverized and reacted with a titanium compound (A-2) which is liquid under the reaction conditions, provided that the above-mentioned electron donor is at least once used;

(2) a liquid magnesium compound (A-1) having no reducibility and a liquid titanium compound (A-2) are reacted with each other in the presence of an electron donor (A-3);

(3) the product obtained by (1) or (2) above is reacted with a titanium compound (A-3);

(4) the product obtained by (1) or (2) above is reacted with an electron donor (A-3). and a titanium compound (A-2);

(5) a magnesium compound (A-1) or a complex of the magnesium compound (A-1) and an electron donor (A-3) is pulverized in the presence of or in the absence of an electron donor and a pulverizing agent and in the presence of a titanium compound (A-2), and treated with a halogen or halogen compound, provided that the electron donor is at least once used; and (6) the compound obtained by (1) to (4) above is treated with a halogen or halogen compound.

Furthermore, as the preferred method of preparing the solid catalyst component (A) in this invention, there may be included ones described in Japanese Patent Kokai=Laid-Open=Nos. 56-166205, 57-63309, 57-190004, 57-300407 and 58-47003.

A solid material comprising the magnesium compound supported on an oxide each of Groups II to IV elements of the Periodic Table, such as silicon oxide, magnesium oxide and aluminum oxide, or a composite oxide including at least one oxide each of Groups II to IV elements of the Periodic Table, such as silica-alumina, an electron donor and a titanium halide may be allowed to contact with each other in a solvent at a temperature of 0° to 200°, preferably 10° to 150° for a period of 2 minutes to 24 hours, to prepare the solid catalyst component (A).

A solvent used in preparing the solid catalyst component may be an organic solvent which is inert to the magnesium compound, electron donor and titanium compound, for example, an aliphatic hydrocarbon such as hexane and heptane, an aromatic hydrocarbon such as benzene and toluene, and a halogenated hydrocarbon such as saturated or unsaturated $C_1$–$C_{12}$ aliphatic, alicyclic or aromatic mono- and poly-halides.

COMPOSITION OF SOLID CATALYST COMPONENT

In the solid catalyst, a magnesium/titanium atomic ratio is in the range of 2 to 100, a halogen/titanium atomic ratio in the range of 5 to 200, and an electron donor/titanium molar ratio in the range of 0.1 to 10.

ORGANOALUMINUM COMPOUND (B)

The organoaluminium compound (B) used in this invention is not limitative and it may be represented by the general formula of

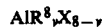

$$AlR^8{}_vX_{8-v}$$

wherein $R^8$ is a $C_1$–$C_{10}$ alkyl, cycloalkyl or aryl group, v a real number and X a halogen atom of chlorine, bromine or the like.

Preferred examples of the organoaluminium compound may be a trialkylaluminum such as trimethylaluminum, triethylaluminum, triisopropylaluminum, triisobutylaluminum and trioctylaluminum; a dialkylaluminum monohalide such as diethylaluminum monochloride, diisopropylaluminum monochloride, diisobutylaluminum monochloride and dioctylaluminum monochloride; and an alkylaluminum sesquihalide such as ethylaluminum sesquichloride, or mixtures thereof.

EXTERNAL ELECTRON DONOR

The important aspect of this invention is that the ether compound ($C^1$) or a combination of the ether compound ($C^1$) with at least one compound ($C^2$) selected from the carboxylic ester ($C^{2-1}$), organosilicon compound ($C^{2-2}$) and azo compound ($C^{2-3}$) is used as the external electron donor.

ETHER COMPOUND ($C^1$)

In this invention, the ether compound ($C^1$) as the external electron donor is represented by the formula [1a] or [1b] above.

In the formula [1a], $R^1$, $R^2$, $R^3$ and $R^4$ may be an alkyl group such as methyl group, ethyl group, n-propyl group, isopropyl group, n-butyl group, isobutyl group, 1-methylpropyl group, t-butyl group, pentyl group, hexyl group and heptyl group; and an alkenyl group such as vinyl group, propenyl group, butenyl group, pentenyl group and hexenyl group. $R^3$ may be hydrogen atom in addition to the alkyl group and alkenyl group.

Among these groups, a lower alkyl group such as methyl group is preferred for $R^1$ and $R^2$. The methyl group is particularly preferred. For $R^3$, hydrogen atom, methyl group, ethyl group, n-propyl group, n-butyl group, n-pentyl group, and n-hexyl group, particularly methyl group and ethyl group are preferred. For $R^4$, methyl group, ethyl group, n-propyl group, isopropyl group, n-butyl group, 1-methylpropyl group, 2-methylpropyl group, tert-butyl group, pentyl group, 1-methylbutyl group and hexyl group, particularly methyl group and ethyl group are preferred.

$R^1$, $R^2$, $R^3$ and $R^4$ may be identical with or different from each other.

The divalent hydrocarbons having 1 to 7 carbons indicated by $R^5$ in the formula [1b] may include, for example, an alkylidene group such as ethylidene group, propylidene group and butylidene group, an alkylene group such as methylene group, tetramethylene group, pentamethylene group and heptamethylene, and an alkenylene group such as 1-peneten-1,5-diyl group.

For $R^6$ in the formula [1b], there may be given the same groups as those for $R^3$. For $R^7$, there may be given the same groups as those for $R^4$.

The ether compounds represented by the formulae [1a] and [1b] may be used singly or in combination as component ($C^1$).

Actual examples of the ether compounds represented by the formula [1a] include saturated ether compounds such as isopropylmethyl ether, isopropylethyl ether, isopropyl-n-propyl ether, diisopropyl ether, isopropyl-n-butyl ether, isopropyl-1-methylpropyl ether, isopropyl-n-butyl ether, isopropylpentyl ether, isopropylhexyl ether, isopropylheptyl ether, tert-butylmethyl ether, tert-butylethyl ether, tert-butyl-n-propyl ether, tert-butylisopropyl ether, tert-butyl-n-butyl ether, tert-butyl-1-methylpropyl ether, tert-butyl-2-methylpropyl ether, ditertbutyl ether, tert-butyl-n-pentyl ether, tert-butyl-1-metylbutyl ether, tert-butyl-2-methylbutyl ether, tert-butyl-3-methylbutyl ether, tert-butyl-tert-amyl ether, tert-butylneopentyl ether, tert-butyl-1-ethylpropyl ether, tert-butylhexyl ether, tert-butylisohexyl ether, tert-butylneohexyl ether, tert-butylheptyl ether, tert-amylmethyl ether, tert-amylethyl ether, tert-amyl-n-propyl ether, tert-amylisopropyl ether, tert-amyl-n-butyl ether, tert-amyl-1-methylpropyl ether, tert-amyl-2-methylpropyl ether, tert-amyl-n-pentyl ether, tert-amyl-1-methylbutyl ether, tert-amyl-2-methylbutyl ether, tert-amyl-3-methylbutyl ether, tert-amyl-1-ethylpropyl ether, tert-amylneopentyl ether, di-tert-amyl ether, tert-amylhexyl ether, tert-amyl-isohexyl ether, tert-amylheptyl ether, 1-methylpropylmethyl ether, 1-methylpropylethyl ether, 1-methylpropylpropyl ether, 1-methylpropylpentyl ether, 1-methylbutylmethyl ether, 1-methylbutylethyl ether, 1-ethylpropylmethyl ether, 1-ethylpropylethyl ether, tert-hexylmethyl ether, tert-hexylethyl ether, 1-methylpentylmethyl ether, 1-methylpentylethyl ether, tert-heptylmethyl ether, tert-heptylethyl ether, 1-methylhexylmethyl ether, 1-methylhexylethyl ether, tert-octylmethyl ether, tert-octylethyl ether, 1-methylheptylmethyl ether and 1-methylheptylethyl ether; and unsaturated ether compounds such as isopropylvinyl ether, isopropylallyl ether, isopropylbutenyl ether, tert-butylvinyl ether, tert-butylallyl ether, tert-butylchlorethyl ether, tert-butylbutenyl ether, tert-amylvinyl ether, tert-amylallyl ether, tert-amylbutenyl ether, (1-methyl-2-propenyl)methyl ether, (1-methyl-2-propenyl)ethyl ether and (1,1-dimethyl-2-propenyl)methyl ether.

Actual examples of the ether compounds represented by the formula [1b] include saturated ether compounds such as 1-methylcyclopentylmethyl ether, 1-methylcyclopentylethyl ether, 1-methylcyclohexylmethyl ether, 1-methylcyclohexylethyl ether, cyclopentylmethyl ether, cyclopentylethyl ether, cyclohexylmethyl ether, cyclohexylethyl ether, cyclopentylisopropyl ether, cyclohexyl-tert-butyl ether and cyclohexyl-tert-amyl ether and unsaturated ether compounds such as vinylmethyl ether, vinylethyl ether, divinyl ether, vinylallyl ether, vinylpropyl ether, vinylbutyl ether, 1-propenylmethyl ether, 1-methyl-1-propenylmethyl ether, 1-propenylethyl ether, 1-propenylethyl ether, 1-methyl-1-propenylethyl ether and 1-methyl-1-propenylallyl ether.

Among these ether compounds, the saturated aliphatic ethers represented by the formula [1a] such as isopropylmethyl, isopropylethyl ether, tert-butylmethyl ether, tert-butylethyl ether, tert-butyl-n-propyl ether, tert-butyl-n-butyl ether, tert-amylmethyl ether, tert-amylethyl ether, tert-amyl-n-propyl ether and tert-amyl-n-butyl ether are preferred. Particularly, tert-butylmethyl ether, tert-butylethyl ether, tert-amylmethyl ether and tert-amylethyl ether are preferred.

The single use of an ether compound other than the ether compounds represented by the formulae [1a] and [1b] as the external electron donor (C) is not preferred, because the catalytic activity and the durability of activity are not satisfactory, and the resultant polymers a bad steric regularity.

However, even such ether compound other than the ether compounds represented by the formulae [1a] and [1b] or even an organic phosphorus compound may be used in combination with the abovementioned ether compounds, as far as it does not obstruct the object of this invention.

COMPOUNDS ($C^2$)

The compounds ($C^2$) above are at least one selected from the group consisting of carboxylic esters ($C^2$-1), organosilicon compounds ($C^2$-2) and azo compounds ($C^2$-3).

As the carboxylic esters ($C^2$-1) can be used, for example, monovalent or polyvalent esters of monovalent or polyvalent saturated or unsaturated aliphatic carboxylic acids, alicyclic carboxylic acids or aromatic carboxylic acids.

Actual examples of the esters are butyl formate, ethyl acetate, butyl acetate, isobutyl acetate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartarate, dibutyl tartarate, diisobutyltartarate, ethyl cyclohexyl carboxylate, methyl benzoate, ethyl benzoate, methyl p-toluate, ethyl p-tert-butyl benzoate, ethyl p-anisate, ethyl α-naphthoate, isobutyl α-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyromellitate, tetrahexyl pyromellitate and tetrabutyl pyromellitate.

Among these compounds diphthalates are preferred, and di-n-butyl phthalate and diallylphthalate are particularly preferred.

Actual examples of the organosilicon compounds ($C^2$-2) are tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoysilane, allyltrimethoxysilane, phenyltrimethoxysilane, phenylethoxysilane, benzyltriphenoxysilane, methyltriallyloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane, methylphenyldimethoxysilane and chlorophenyldiethoxysilane.

As the azo compounds ($C^2$-3) there may be used an aliphatic azo compounds, alicyclic azo compounds and aromatic azo compounds which are normally used as an initiator for radical polymerization. Azo compounds containing at least one, preferably two substituents having steric hindrance, such as tertiary carbon atom, benzene ring and diarylmethyl, bonded to the azo group (—N=N—), are suitably used. Actual examples of the azo compounds are 2,2'-azobis(2-mehylpropane), 2,2'-azobis( 2-ethylpropane), 2,2'-azobis(2-methylpentane), 2,2'-azobis(2-ethylbutane), α,α'-azobisisobutylonitrile, 1,1'-azobis(1-cyclohexanecarbonitrile), 1-tert-butylazo-1-cyanocyclohexane, (1-phenyl-methyl)-azodiphenylmethane and 2-phenylazo-2,4-dimethyl-4-methoxypentanenitrile.

Among these compounds is preferred 1-tert-butylazo-1-cyanocyclohexane.

COMPOSITION OF CATALYST COMPONENT

As components of catalysts for olefin polymerization, the abovementioned solid catalyst component (A) is normally in an amount of 0.0005 to 1 mmol per 1 liter of reaction volume in terms of titanium atom, and the organoaluminum compound (B) is in such an amount that an aluminum/titanium atomic ratio is in a range of 1 to 1000, preferably 5 to 500.

The external electron donor (C) is in such an amount that the total of the ether compounds of the formulae [1a] and [1b]/titanium molar ratio is normally in a range of 0.1 to 500, preferably 1 to 100. If the molar ratio is less than 0.1, the durability of catalytic activity and the steric regularity of polymer are unsatisfactory. If the molar ratio exceeds 500, the catalytic activity may be reduced.

As for the fourth component ($C^2$), a total of the component ($C^2$-2) and the component ($C^2$-3)/titanium molar ratio is normally in a range of 1 to 200, preferably 5 to 100. The catalytic activity and the steric regularity of polymer are improved within this range.

POLYMERIZATION

In accordance with the method of this invention, the homopolymerization of an olefin or the copolymerization of olefins is carried out in the presence of the abovementioned catalyst.

In the case of producing a homopolymer, only one kind of olefin may be charged into a reactor, in which the homopolymerization is carried out at a temperature of 40° to 90° C. and a pressure of 1 to 100 kg/cm²G.

In the case of producing a random copolymer, plural kinds of olefins may be charged into a reactor in which the copolymerization is carried out.

In the case of producing a block copolymer, the first-stage homopolymerization of olefin may be followed by the second-stage copolymerization of one kind of olefin or plural kinds of olefins with the homopolymer obtained in the first-stage homopolymerization.

The olefin used may be represented by the general formula:

$$R^9-CH=CH_2$$

wherein $R^9$ is hydrogen or an alkyl group or cycloalkyl group having 1 to 12 carbons. Actual examples of the olefin are straight-chain monoolefins such as ethylene, propylene, butene-1, pentene-1 and octene-1, further branched monoolefins such as 4-methyl-pentene-1, and vinylcyclohexane.

Among these olefins propylene and butene-1 are preferred.

The type of polymerization may be a slurry polymerization, vapor phase polymerization or bulk polymerization using a liquid monomer itself as a solvent.

In a so-called block copolymerization, the first and second reactors are connected to each other in series. This block copolymerization is carried out in the following manner: in the first reactor one kind of olefin, propylene, is polymerized at a temperature of 90° C. or lower and a pressure of 1 to 100 kg/cm²G to form 30 to 99 wt % of a polymer based on the finally obtained polymer total weight, and then in the second reactor, the polymer transferred from the first reactor or volatile part of unreacted olefin removed from the polymer of the first reactor through a deaerator provided between the first and second reactors, to which are supplied the abovementioned olefin and other olefins, such as ethylene, is subjected to the polymerization at a temperature not higher than 90° C. and a pressure of 1 to 100 kg/cm²G., while maintaining the reaction system in a fluidized state to form 70 to 1 wt % of the finally obtained total polymer amount of a final copolymer product containing 1 to 30 wt % of the other olefin or olefins. If necessary, prepolymerization with a small amount of other olefins may be carried out before the first polymerization.

The molecular weight of the thus formed polymer can be controlled by adjusting the hydrogen concentration in the reactors. The catalyst component can be supplied in a form of suspension in an inert solvent or olefin.

In this invention the post-treatment after the polymerization may be carried out in a usual way. That is, in the vapor phase polymerization, a nitrogen gas stream may be allowed to pass through the polymer powder derived from the reactors to remove olefins contained in the powder. The powder may be pelletized by extrusion, as desired. In this case, a small amount of water or alcohol may be added to completely deactivate the catalyst. In the bulk polymerization, monomers may be completely separated from the polymer derived from the reactors and the polymer may be pelletized.

The polyolefin produced according to this invention normally have an intrinsic viscosity [η] (tetralin solution; 135° C.) of 1.0 to 6 dl/g, particularly 1.3 dl/g or more, and a steric regularity (I.I.) of 96 % or more. I.I. means a percentage of retention in extraction of polypropylene when Soxhlet extracted with n-heptane for 6 hours.

This invention has the following advantages:

(1) the polymer produced according to the method of this invention has a good steric regularity and, therefore, it can be formed in an article having a good appearance;

(2) according to this invention a polymer powder having a high molecular weight and an excellent flowability can be obtained and, therefore, the polymer of this invention is suitable for transportation of powders.

(3) the method of this invention is highly economical, because the yield of polyolefin is high;

(4) the catalyst of this invention is kept active for a long period of time and, therefore, the polymerization process can be rendered stable and particularly this invention is advantageous when applied to the multistage polymerization;

(5) in this invention, the use of the vapor phase polymerization can avoid the step of recovering a polymerization medium and greatly simplify the step of drying polymers; and (6) the use of the specified ether compound as an external electron donor according to the method of this invention can produce a polymer having an excellent steric regularity.

Furthermore, the use of at least one selected from the group consisting of a carboxylate, organosilicon compound and azo compound in addition to the specified ether compound as an external electron donor according to the method of this invention can produce a polymer having much better steric regularity.

This invention will be illustrated below with reference to some example and comparative examples.

EXAMPLE 1

1. Preparation of Solid Catalyst Component 200 ml of butyloctyl magnesium (20 % heptane solution and 150 ml of heptane were placed in a 2-liter flask filled with argon gas, to which was added about 4 liters of chlorine gas at room temperature over 30 minutes. This flask was heated to 90° C. 24 ml of ethanol was added to the flask and agitation then carried out at 90° C. for 10 minutes. The reaction product was twice washed with 200 ml of heptane and the supernatant liquid then removed. To the remainder were added 400 ml of kerosine and 24 ml of ethanol to form a mixture, which was agitated at 100° C. for 2 hours to form a dispersion. This dispersion was transferred to a 500 ml TiCl₄/200 ml heptane solution cooled to −20° C. and heated to room temperature. To this solution was added 3 ml di-n-butyl phthalate, and this solution agitated at 110° C. for 1 hour. The supernatant liquid was removed, then 600 ml of TiCl₄ was added and agitation carried out at 110° C. for 1 hour. The supernatant liquid was removed and then washing with heptane carried out. Thus, the solid catalyst component was obtained.

2. Preparation of Polyolefin 400 ml of heptane was charged in a 1-liter autoclave made of stainless steel. Then, to this autoclave were charged 1 mmol of triisobutylaluminum, 0.1 mmol of tert-butylmethyl ether and 0.0025 mmol of the solid catalyst component obtained above in terms of titanium atom, in this order. The polymerization was carried out at 70° C. for 4 hours, while maintaining the autoclave at a hydrogen pressure of 0.2 kg/cm² and a propylene pressure of 7 kg/cm².

The results are shown in Table 1.

EXAMPLE 2 AND COMPARATIVE EXAMPLES 1 AND 2

The procedures of EXAMPLE 1—1 were repeated, except that tert-butylmethyl ether was replaced with the other external electron donors indicated in Table 1.

The results are shown in Table 1.

EXAMPLE 3

The procedures of EXAMPLE 1 were repeated with the same solid catalyst component (A) as used in EXAMPLE 1, except that 0.08B mmol of di-n-butylphthalate was used as an external electron donor.

The results are shown in Table 2.

EXAMPLES 4 TO 7 AND COMPARATIVE EXAMPLES 3

The procedures of EXAMPLE 3 were repeated, except that the external electron donors and the fourth components indicated in Table 2 were used.

EXAMPLE 8

(1) Preparation of Solid Catalyst Component 3 liters of dehydrated and purified n-hexane, 500 grs (4.4 mol) of magnesium diethoxide and 153.0 grs (0.55 mol) of diisobutylphthalate were placed in a well-dried 10 liter four-necked flask and subjected to reaction under reflux for 1 hour. Then, 2.5 kgrs (132 mol) of titanium tetrachloride was dropped into the reaction product at 90° C. for a short period of time. Further reaction was carried out at 110° C. for 2 hours. Thereafter, the reaction product, from which a supernatant liquid was removed at 30° C. and then to which 7 liters of n-heptane was added, was agitated and then left to stand. From the reaction product was removed a supernatant liquid. This operation was twice repeated for washing. To the washed reaction product was added 3 liters of n-heptane and dropped 2.5 kgrs (132 mol) of titanium tetrachloride. Further reaction was carried out at 110° C. for 2 hours. From the reaction product was removed a supernatant liquid at 80° C. and to the reaction product was added 2 liters of n-heptane for washing. This washing was repeated until no chloride ions were detected. Thus, the solid catalyst component was obtained. The colorimetric measurement showed that the content of titanium supported in the catalyst was 2.4 wt %.

(2) Preparation of Catalyst

The solid catalyst component obtained in (1) above was diluted with n-heptane to be in 2 mmol Ti/liter. 10 liters of the resultant dispersion was charged into a catalyst-preparing vessel. This vessel was supplied with 40 mmol/liter of triisobutylaluminum, 40 mmol/liter of t-butyl methyl ether and 4 mmol/liter of dicyclohexyl phthalate and then with 50 grs per mmol of titanium of propylene. The vessel content was heated to 40° C. to obtain the catalyst.

(3) Preparation of Butene-1 Homopolymer

The catalyst obtained at (2) above was dried and charged at a flow rate of 0.45 gr/hr into a fluidized bed reactor of 300 mm in diameter and 100 liters in volume. To this reactor were further supplied triisobutylaluminum at a flow rate of 4.5 mmol/hr, t-butylmethyl ether at a flow rate of 4.5 mmol/hr and dicyclohexyl phthalate at a flow rate of 0,45 mmol/hr.

Butene-1 and nitrogen gas were supplied to the reactor at adjusted partial pressures of 3 kgr/cm² and 4 kgr/cm², respectively, and at a gas flow speed of 30 cm/sec. Discharging of the polymer was adjusted so that the amount of the polymer in the reactor was kept constant.

The polymerizing temperature was 55° C.

TABLE 1

|  | Activity (kg PP/g Ti) | | I.I | [η] | External Electron |
|---|---|---|---|---|---|
|  | After 2 hrs | After 4 hrs | % | dl/g | Donor (C) |
| Ex. 1 | 805 | 1480 | 92.8 | 1.6 | t-butylmethyl eth. |
| Ex. 2 | 720 | 1311 | 93.1 | 1.8 | t-amylethyl eth. |
| Comp. Ex. 1 | 243 | 292 | 92.1 | 1.6 | p-methyl toluylate |
| Comp. Ex. 2 | 350 | 506 | 61.0 | 1.5 | — |

I.I: a percentage of retention in extraction of the obtained polymer when Soxhlet extracted with n-heptane for 6 hours
[η]: intrinsic viscosity measured in tetralin solution at 135° C.

TABLE 2

|  | External Electron Donor (C) | Forth Component (D) | Activity (kg PP/g Ti) | | I.I % | [η] dl/g |
|---|---|---|---|---|---|---|
|  |  |  | After 2 hrs | After 4 hrs |  |  |
| Ex. 3 | t-butylmethyl ether | di-n-butyl phthalate | 562 | 1043 | 98.9 | 1.7 |
| Ex. 4 | " | diallyl phthalate | 580 | 1090 | 98.2 | 1.6 |
| Ex. 5 | " | cyclohexanedicarboxylic acid-diethyl ether 0.2 mml | 545 | 1008 | 97.8 | 1.6 |
| Ex. 6 | "1-t-butylazo-1-cyanocyclo-hexane 0.23 mmol |  | 512 | 929 | 96.2 | 1.5 |
| Ex. 7 | t-amylethyl ether | di-n-butyl phthalate | 491 | 938 | 97.8 | 1.7 |
| Ex. 8 | t-butylmethyl ether | di-cyclohexyl phthalate | — | 200 | 97.4* | 4.1 |
| Comp. Ex. 3 | — | di-n-butyl phthalate | 209 | 273 | 86.3 | 1.3 |

I.I: a percentage of retention in extraction of the obtained polymer when Soxhlet extracted with n-heptane for 6 hours
[η]: intrinsic viscosity measured in tetralin solution at 135° C.
*a percentage of retention in extraction of the obtained polymer when Soxhlet extracted with diethyl ether.

What is claimed is:
1. A method of producing a polyolefin which comprises carrying out homopolymerization or copolymer- ization of olefins represented by the general formula R$^9$—CH=CH$_2$, wherein R$^9$ is hydrogen, an alkyl group or cycloalkyl group having 1 to 12 carbons, at a temperature of 40° to 90° C. and a pressure of 1 to 100 kg/cm$^2$G in the presence of a catalyst comprising:
- (A) a highly active catalyst component containing magnesium, titanium and an electron donor, prepared by contacting a magnesium compound selected from the group consisting of an alkyl magnesium and an alkoxy magnesium, a titanium halide and an electron donor;
- (B) an organoaluminum compound of the formula AlR$^8$$_v$X$_{3-v}$, wherein R$^8$ is a C$_1$–C$_{10}$ alkyl, cycloalkyl or aryl group, v is a real number and X is chlorine or bromine; and
- (C) an external electron donor consisting of a tertiary ether (C$^1$) selected from the group consisting of tert-butyl methyl ether, tert-butyl ethyl ether, tert-amyl methyl ether and tert-amyl ethyl ether and (C$^2$) a carboxylate ester;

wherein said catalyst contains said solid catalyst component (A) in an amount of 0.0005 to 1 mmol in terms of titanium atoms, based on a reaction volume of 1 liter, said organoaluminum compound (B) in such an amount that the aluminum/titanium atomic ratio is in the range of 5 to 500, said ether compound (C$^1$) in such an amount that the ether compound/titanium molar ratio is in the range of 1 to 100, and said compound (C$^2$) in such an amount that the compound (C$^2$)/titanium molar ratio is in the range of 5 to 100.

2. The method of producing a polyolefin according to claim 1, wherein said carboxylate is dibutylphthalate or diallyphthalate.

3. The method of producing a polyolefin according to claim 1, wherein said solid catalyst component (A) is prepared from butyloctylmagnesium, titanium tetrachloride and di-n-butyl phthalate.

4. The method of producing a polyolefin according to claim 1, wherein said organoaluminum compound (B) is a trialkyl-aluminum.

5. The method of producing a polyolefin according to claim 1, wherein said organoaluminum compound (B) is triisobutyl-aluminum.

6. The method of producing a polyolefin according to claim 1, wherein said olefin is propylene.

* * * * *